(12) United States Patent
Taylor et al.

(10) Patent No.: US 9,677,758 B2
(45) Date of Patent: Jun. 13, 2017

(54) GASEOUS FUEL-OXYGEN BURNER

(71) Applicant: Honeywell International Inc., Morristown, NJ (US)

(72) Inventors: Curtis Taylor, Gaston, IN (US); Christopher S. Eldridge, Muncie, IN (US); Brad Patterson, Dunkirk, IN (US); Jayson Perdue, New Castle, IN (US); William R. Berkenbush, Muncie, IN (US)

(73) Assignee: Honeywell International Inc., Morris Plains, NJ (US)

( * ) Notice: Subject to any disclaimer, the term of this patent is extended or adjusted under 35 U.S.C. 154(b) by 224 days.

(21) Appl. No.: 14/019,867

(22) Filed: Sep. 6, 2013

(65) Prior Publication Data

US 2015/0072294 A1 Mar. 12, 2015

(51) Int. Cl.
 *F23D 14/02* (2006.01)
 *F23D 14/32* (2006.01)
 *F23D 14/22* (2006.01)

(52) U.S. Cl.
 CPC ............ *F23D 14/02* (2013.01); *F23D 14/22* (2013.01); *F23D 14/32* (2013.01)

(58) Field of Classification Search
 CPC .................................. F23D 14/22; F23D 14/32
 USPC .............................................. 431/8, 181, 354
 See application file for complete search history.

(56) References Cited

U.S. PATENT DOCUMENTS

| | | | |
|---|---|---|---|
| 3,685,740 A * | 8/1972 | Shepherd | 239/400 |
| 4,494,923 A * | 1/1985 | Guillaume | F23D 14/32 431/264 |
| 5,217,363 A | 6/1993 | Brais et al. | |
| 5,863,195 A | 1/1999 | Feldermann | |
| 5,944,507 A * | 8/1999 | Feldermann | 431/189 |
| 6,176,894 B1 * | 1/2001 | Anderson | C21O 5/4606 75/10.4 |
| 6,233,974 B1 | 5/2001 | Anderson et al. | |
| 2001/0055737 A1 | 12/2001 | Sestrap | |

(Continued)

FOREIGN PATENT DOCUMENTS

| | | |
|---|---|---|
| EP | 0754912 | 1/1997 |
| WO | 2009068593 A1 | 6/2009 |

OTHER PUBLICATIONS

"Electric Valve Actuators Information." IHS GlobalSpec. Sep. 4, 2013. http://www.globalspec.com/learnmore/flow_transfer_control/valve_actuators_positioners/electric_electronic_motor_actuators. 3 pages.

(Continued)

*Primary Examiner* — Avinash Savani
*Assistant Examiner* — Rabeeul Zuberi
(74) *Attorney, Agent, or Firm* — Brooks, Cameron & Huebsch, PLLC

(57) ABSTRACT

A gaseous fuel-oxygen burner is described herein. One device includes a flame zone in which combustion of gaseous fuel and oxygen occurs to form a flame, a coaxial gaseous fuel jet configured to provide the flame zone with gaseous fuel, and a coaxial oxygen jet configured to provide the flame zone with oxygen, wherein the coaxial gaseous fuel jet and the coaxial oxygen jet are separate such that the gaseous fuel from the coaxial gaseous fuel jet and the oxygen from the coaxial oxygen jet do not mix before entering the flame zone.

17 Claims, 4 Drawing Sheets

(56) References Cited

U.S. PATENT DOCUMENTS

2004/0261671 A1* 12/2004 Taylor .................... F23C 9/003
                                                        110/261
2006/0108724 A1*  5/2006 Sato ........................ C21B 13/10
                                                        266/217
2007/0298356 A1* 12/2007 Rangmark et al. ............... 431/8
2013/0125798 A1   5/2013 Taylor

OTHER PUBLICATIONS

"Electric Actuator and Actuator Control line from Warner Linear." Warner Electric. Sep. 4, 2013. http://www.warnerelectric.com/actuators.asp. 4 pages.
"Limitorque QXM smart valve actuator." Flowserve. Sep. 4, 2013. http://www.flowserve.com/files/Files/Literature/ProductLiterature/FlowControl/Limitorque/LMENFL3310.pdf. 2 Pages.
International Search Report and Written Opinion from related PCT Application PCT/US2014/051060 dated Nov. 26, 2014, 10 pp.
Extended Search Report from related European Application No. 14843047.3, dated Mar. 21, 2017, 8 pages.

* cited by examiner

GASEOUS FUEL-OXYGEN BURNER

TECHNICAL FIELD

The present disclosure relates to gaseous fuel-oxygen burners.

BACKGROUND

A gas burner can produce (e.g., generate) a flame using a gaseous fuel, such as hydrogen, propane, or natural gas. For example, a gaseous fuel-oxygen burner may produce a flame by mixing a gaseous fuel with oxygen. Gaseous fuel-oxygen burners may be used to produce flames in a number of industrial applications.

Previous gaseous fuel-oxygen burners may include a single (e.g., one) coaxial jet. Gaseous fuel may flow through the center of the single jet, and oxygen may be supplied (e.g., fed) into the outer portion of the single jet around the gaseous fuel, to produce the flame.

Such single coaxial jets may be simple to design and manufacture. However, such single coaxial jets may produce a flame that is too voluminous (e.g., too long) for the intended industrial application(s) of the burner.

DETAILED DESCRIPTION

Figure 1A:
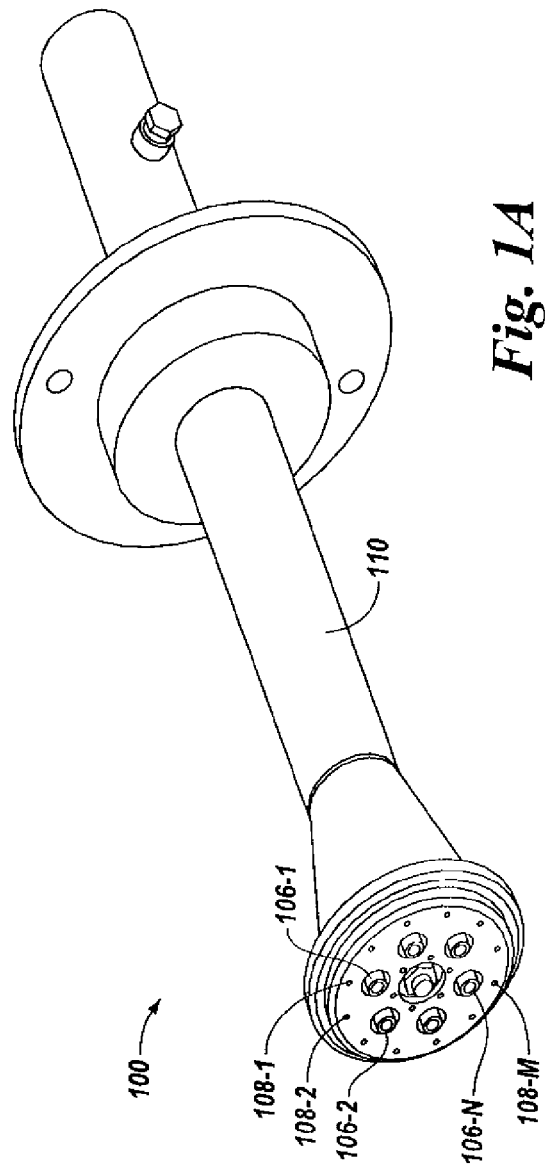
FIGS. 1A-1D illustrate various views of a gaseous fuel-oxygen burner in accordance with one or more embodiments of the present disclosure.

A gaseous fuel-oxygen burner is described herein. For example, one or more embodiments include a flame zone in which combustion of gaseous fuel and oxygen occurs to form a flame, a coaxial gaseous fuel jet configured to provide the flame zone with gaseous fuel, and a coaxial oxygen jet configured to provide the flame zone with oxygen, wherein the coaxial gaseous fuel jet and the coaxial oxygen jet are separate such that the gaseous fuel from the coaxial gaseous fuel jet and the oxygen from the coaxial oxygen jet do not mix before entering the flame zone.

Gaseous fuel-oxygen burners in accordance with the present disclosure may be able to produce less voluminous (e.g., shorter) flames than previous gaseous fuel-oxygen burners (e.g., gaseous fuel-oxygen burners having only a single coaxial jet). Accordingly, gaseous fuel-oxygen burners in accordance with the present disclosure may be suitable for more applications (e.g., more industrial applications) than previous gaseous fuel-oxygen burners.

Additionally, gaseous fuel-oxygen burners in accordance with the present disclosure may have a non-liquid cooling design (e.g., the fuel jet of the burner can be cooled without using water or other liquids). In many applications (e.g., industrial applications), liquids may not be used to cool the burner (e.g., the fuel jet of the burner) due to, for example, the danger of a leak at the high operating temperatures of the burner causing a rapid expansion of vapor that can endanger personnel and/or damage equipment. Accordingly, the non-liquid cooling design of the present disclosure may further expand the number of applications for which gaseous fuel-oxygen burners in accordance with the present disclosure are suitable.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 114 may reference element "14" in FIGS. 1A-1D, and a similar element may be referenced by 214 in FIGS. 2A-2B.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of openings" can refer to one or more openings. Additionally, the designators "N", "M", "L", and "K" as used herein, particularly with respect to reference numerals in the drawings, indicates that a number of the particular feature so designated can be included with embodiments of the present disclosure.

Figure 1B:
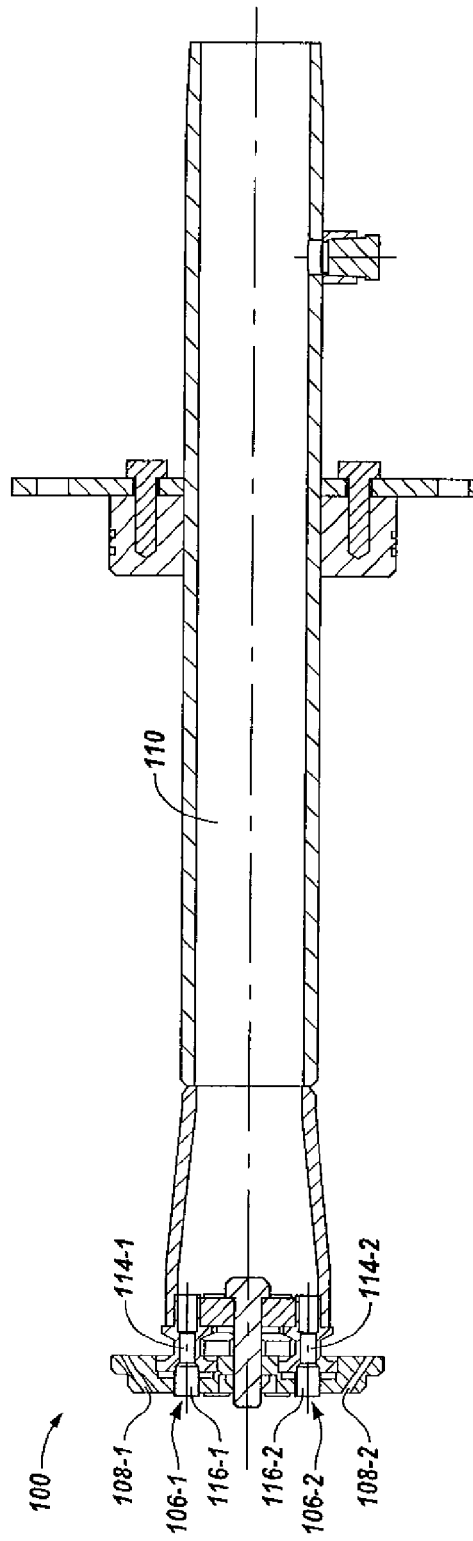
Figure 1C:
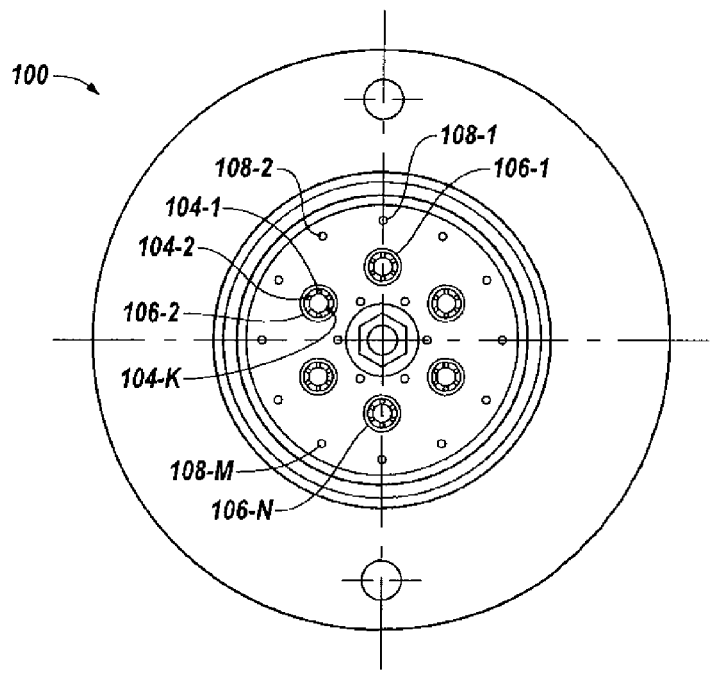
Figure 1D:
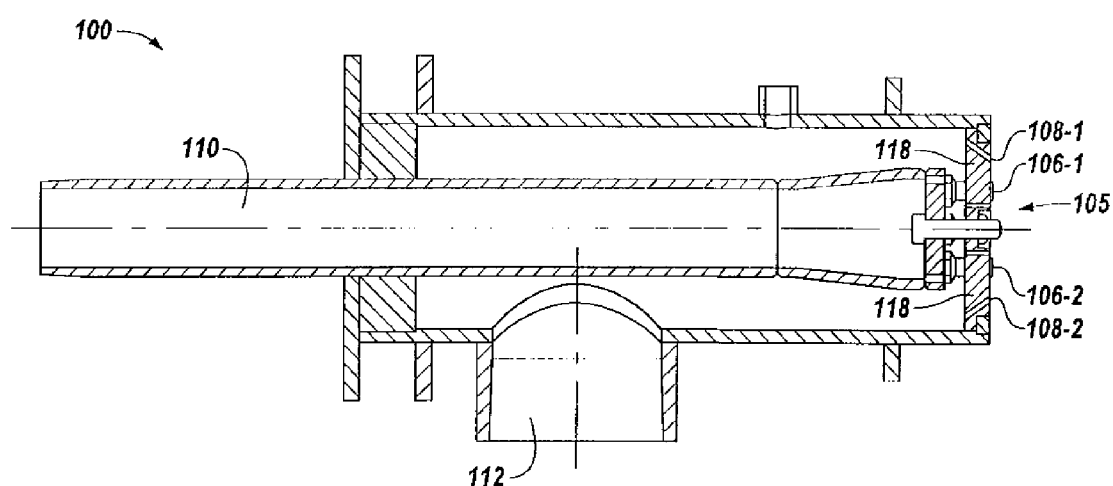

FIGS. 1A-1D illustrate various views of a gaseous fuel-oxygen burner 100 in accordance with one or more embodiments of the present disclosure. For example, FIG. 1A illustrates an angled perspective view of burner 100, FIG. 1B illustrates a schematic cross-sectional view of burner 100, FIG. 1C illustrates a schematic front view of burner 100, and FIG. 1D illustrates an additional schematic cross-sectional view of burner 100.

As shown in FIGS. 1B-1D, gaseous fuel-oxygen burner 100 can include a number of coaxial gaseous fuel jets 114-1, 114-2, ... 114-N, a number of coaxial oxygen jets 104-1, 104-2, ..., 104-K, and a flame zone 105. Fuel jets 114-1, 114-2, ..., 114-N and oxygen jets 104-1, 104-2, ..., 104-K can be separate, as illustrated in FIGS. 1B-1D, which can reduce the volume of (e.g., shorten) a flame formed in flame zone 105, as will be further described herein.

Coaxial gaseous fuel jets 114-1, 114-2, ..., 114-N can provide (e.g., supply) flame zone 105 with gaseous fuel (e.g., a gaseous fuel stream), and coaxial oxygen jets 104-1, 104-2, ..., 104-K can provide (e.g., supply) flame zone 105 with oxygen (e.g., an oxygen stream). For example, the fuel jets can inject and/or eject gaseous fuel into flame zone 105, and the oxygen jets can inject and/or eject oxygen into flame zone 105. The gaseous fuel and the oxygen can combust in flame zone 105 to form a flame.

The gaseous fuel provided by coaxial gaseous fuel jets 114-1, 114-2, ..., 114-N can be, for example, hydrogen, propane, or natural gas. The oxygen provided coaxial oxygen jets 104-1, 104-2, ..., 104-K can be, for example, 80% pure oxygen. However, embodiments of the present disclosure are not limited to a particular type of gaseous fuel or a particular oxygen purity.

In some embodiments, the gaseous fuel from coaxial gaseous fuel jets 114-1, 114-2, ..., 114-N and the oxygen from oxygen jets 104-1, 104-2, ..., 104-K may not mix (e.g., may be kept completely separate) before entering flame zone 105, which can reduce the volume of (e.g., shorten) the flame formed in flame zone 105. Such embodiments will be further described herein (e.g., in connection with FIGS. 3A-3B).

In some embodiments, a portion (e.g., fraction) of the oxygen from coaxial oxygen jets 104-1, 104-2, ..., 104-K may mix with the gaseous fuel from coaxial gaseous fuel jets 114-1, 114-2, ..., 114-N before entering flame zone 105, which can reduce the volume of the flame formed in flame zone 105. For example, the fuel jets can receive the portion of the oxygen from the oxygen jets before the oxygen from the oxygen jets enters flame zone 105, and the fuel jets can then provide flame zone 105 with the gaseous fuel mixed with the portion of the oxygen received from the oxygen jets. The portion of the oxygen from the oxygen jets can be, for example, less than the amount of oxygen needed to combust the gaseous fuel, such that the portion of the oxygen and the gaseous fuel do not combust in the fuel jets. This pre-mixing of the gaseous fuel with the portion of the oxygen can promote rapid ignition and combustion in flame zone 105, which can reduce the volume of the flame formed in flame zone 105. Such embodiments will be further described herein (e.g., in connection with FIGS. 2A-2B).

Each coaxial gaseous fuel jet 114-1, 114-2, ..., 114-N can include an opening (e.g., nozzle) adjacent flame zone 105 to provide flame zone 105 with the gaseous fuel (e.g., the gaseous fuel mixed with the portion of oxygen). For example, fuel jet 114-1 can include opening 106-1, fuel jet 114-2 can include opening 106-2, etc. adjacent flame zone 105 to provide flame zone 105 with the gaseous fuel, as shown in FIGS. 1A-1D. Openings 106-1, 106-2, ..., 106-N can be radial openings (e.g., positioned radially around gaseous-fuel oxygen burner 100). Although the embodiment illustrated in FIGS. 1A-1D includes six such radial openings, embodiments of the present disclosure are not limited to a particular number of openings or a particular positioning for the openings.

Each coaxial oxygen jet 104-1, 104-2, ..., 104-K can include an opening (e.g., hole or slot) adjacent flame zone 105 to provide flame zone 105 with the oxygen. The openings can be smaller (e.g., have a smaller diameter) than openings 106-1, 106-2, ..., 106-N of fuel jets 114-1, 114-2, ..., 114-N), and can be radial openings (e.g., positioned radially around openings 106-1, 106-2, ..., 106-N). Although the embodiment illustrated in FIGS. 1A-1D includes six such radial openings positioned around each fuel jet opening, embodiments of the present disclosure are not limited to a particular number of openings or a particular positioning for the openings.

Further, mixing plate 118 can include a plurality of radial openings 108-1, 108-2, ..., 108-M (e.g., a plurality of openings positioned radially around mixing plate 118) adjacent flame zone 105 to provide flame zone 105 with oxygen, as shown in FIGS. 1A-1D. Openings 108-1, 108-2, ..., 108-M can be smaller (e.g., have a smaller diameter) than openings 106-1, 106-2, ..., 106-N, and can be positioned radially inside and radially outside of openings 106-1, 106-2, ..., 106-N, as illustrated in FIGS. 1A-1D. Although the embodiment illustrated in FIGS. 1A-1D includes 18 such radial openings, embodiments of the present disclosure are not limited to a particular number of openings or a particular positioning for the openings.

The openings of coaxial oxygen jets 104-1, 104-2, ..., 104-K, and/or radial openings 108-1, 108-2, ..., 108-M, can provide oxygen into flame zone 105 in a uniform annular distribution about radial openings 106-1, 106-2, ..., 106-N of coaxial gaseous fuel jets 114-1, 114-2, ..., 114-N. Providing oxygen into flame zone 105 in such a manner can cool fuel jets 114-1, 114-2, ..., 114-N, and/or prevent a flame formed in flame zone 105 from attaching to fuel jets 114-1, 114-2, ..., 114-N.

As shown in FIGS. 1A-1D, gaseous fuel-oxygen burner 100 can include a single (e.g., one) fuel supply connection (e.g., tube) 110 coupled to coaxial gaseous fuel jets 114-1, 114-2, ..., 114-N. Fuel supply connection 110 can provide the gaseous fuel to the fuel jets. For example, fuel supply connection 110 can provide a uniform distribution of the gaseous fuel to openings 106-1, 106-2, ..., 106-N of the fuel jets.

As shown in FIGS. 1A-1B and 1D, gaseous fuel-oxygen burner 100 can include a single (e.g., one) oxygen supply connection (e.g., tube) 112 coupled to coaxial oxygen jets 104-1, 104-2, ..., 104-K. Oxygen supply connection 112 can provide the oxygen to the oxygen jets. For example, oxygen supply connection 112 can provide a uniform distribution of the oxygen to the openings of the oxygen jets.

In the embodiment illustrated in FIG. 1B, each coaxial gaseous fuel jet 114-1, 114-2, ..., 114-N can include a counter bore port (e.g., sleeve) 116-1, 116-2, ..., 116-N, respectively, that corresponds to (e.g., forms) openings 106-1, 106-2, ..., 106-N, respectively, in the fuel jets (e.g., counter bore port 116-1 can correspond to opening 106-1, counter bore port 116-2 can correspond to opening 106-2, etc.), as illustrated in FIG. 1B. The diameters of fuel jets 114-1, 114-2, ..., 114-N can increase at counter bore ports 116-1, 116-2, ..., 116-N, as illustrated in FIG. 1B.

In some embodiments, coaxial gaseous fuel jets 114-1, 114-2, ..., 114-N may not include a counter bore port that increases the diameter of the fuel jets. Such embodiments will be further described herein (e.g., in connection with FIGS. 3A-3B).

As shown in FIG. 1D, gaseous fuel-oxygen burner 100 can include a single mixing plate 118 coupled to and standing apart from fuel supply connection 110. Mixing plate 118 can form coaxial oxygen jets 104-1, 104-2, ..., 104-K to allow the oxygen from oxygen supply connection 112 to bypass (e.g., flow around) coaxial gaseous fuel jets 114-1, 114-2, ..., 114-N to the openings of oxygen jets 104-1, 104-2, ..., 104-K. Mixing plate 118 can include openings for (e.g., corresponding to) openings 106-1, 106-2, ..., 106-N of fuel jets 114-1, 114-2, ..., 114-N. Further, mixing plate 118 can include openings 108-1, 108-2, ..., 108-M, as previously described herein.

Figure 2A:
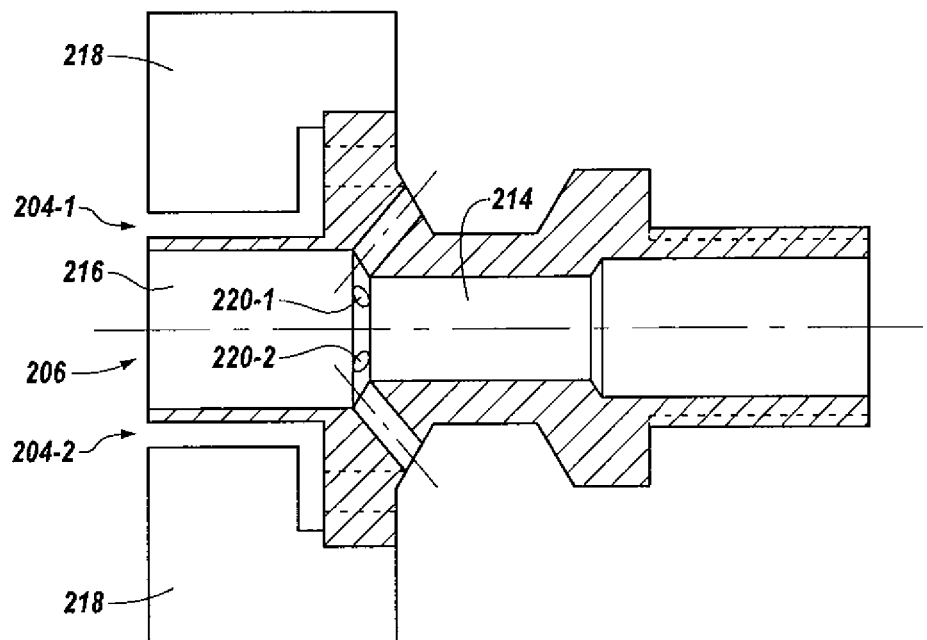
FIGS. 2A-2B illustrate various views of a portion of a coaxial gaseous fuel jet in accordance with one or more embodiments of the present disclosure.
Figure 2B:
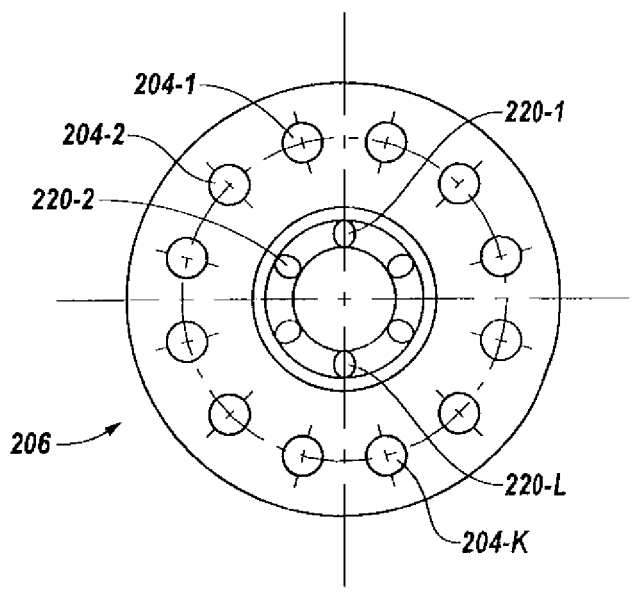

FIGS. 2A-2B illustrate various views of a portion of a coaxial gaseous fuel jet 214 in accordance with one or more embodiments of the present disclosure. For example, FIG. 2A illustrates a schematic cross-sectional view of fuel jet 214, and FIG. 2B illustrates a schematic front view of fuel jet 214. In the embodiment illustrated in FIGS. 2A and 2B, a portion (e.g., fraction) of oxygen from coaxial oxygen jets 204-1, 204-2, ..., 204-K may mix with gaseous fuel from coaxial gaseous fuel jet 214 before entering a flame zone (e.g., flame zone 105 previously described in connection with FIGS. 1A-1D). The oxygen from the oxygen jets that does not mix with the gaseous fuel from fuel jet 214 before entering the flame zone can enter the flame zone in a uniform annular distribution about opening 206 of fuel jet 214, which can cool fuel jet 214 and/or prevent a flame formed in the flame zone from attaching to fuel jet 214.

As shown in FIGS. 2A-2B, coaxial gaseous fuel jet 214 can include an opening (e.g., nozzle) 206, a counter bore port (e.g., sleeve) 216, and a plurality of openings (e.g., holes and/or ports) 220-1, 220-2, . . . , 220-L adjacent counter bore port 216 (e.g., where the diameter of fuel jet 214 increases). Openings 220-1, 220-2, . . . , 220-L can be radial openings (e.g., positioned radially around fuel jet 214). Although the embodiment illustrated in FIGS. 2A-2B includes six such radial openings, embodiments of the present disclosure are not limited to a particular number of openings or a particular positioning for the openings.

Openings 220-1, 220-2, . . . , 220-L can be adjacent (e.g., penetrate into) coaxial oxygen jets 204-1, 204-2, . . . , 204-K and receive the portion of oxygen from the coaxial oxygen jets before the oxygen enters the flame zone. The portion of the oxygen received from the oxygen jets can be, for example, less than the amount of oxygen needed to combust the gaseous fuel from coaxial gaseous fuel jet 214, such that the portion of the oxygen and the gaseous fuel do not combust in fuel jet 214, as previously described herein (e.g., in connection with FIGS. 1A-1D).

Coaxial gaseous fuel jet 214 can carry the gaseous fuel before the gaseous fuel is mixed with the portion of the oxygen received from coaxial oxygen jets 204-1, 204-2, . . . , 204-K via openings 220-1, 220-2, . . . , 220-L, counter bore port 216 can carry the gaseous fuel mixed with the portion of the oxygen received from the oxygen jets, and the gaseous fuel mixed with the portion of the oxygen received from the oxygen jets can enter the flame zone via opening 206. The diameters of coaxial gaseous fuel jet 214 and counter bore port 216 can be sized such that the velocity of the gaseous fuel carried through fuel jet 214 is equal to the velocity of the gaseous fuel mixed with the portion of the oxygen carried through counter bore port 216.

Figure 3A:
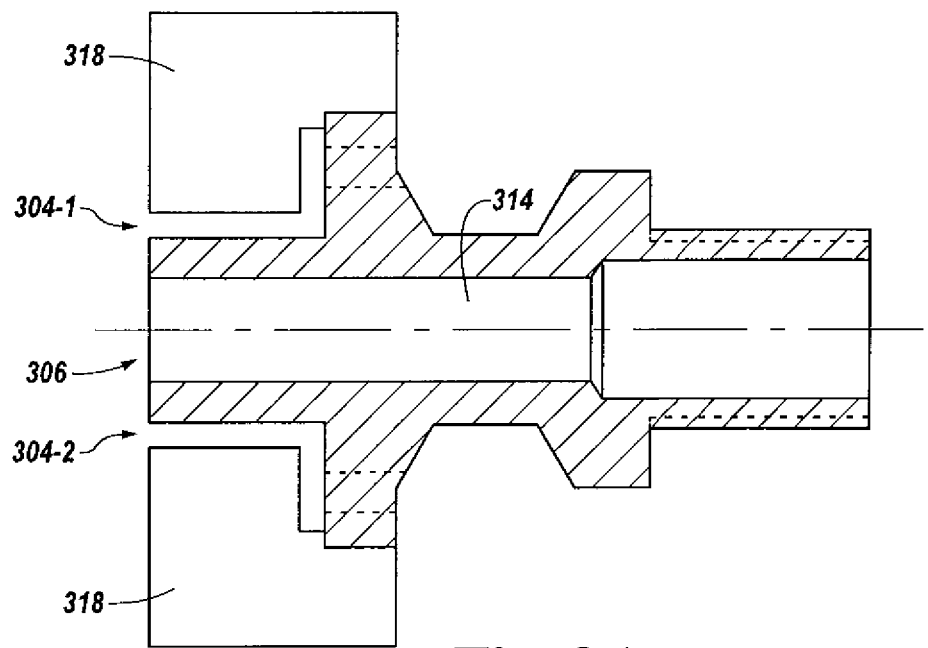
FIGS. 3A-3B illustrate various views of a portion of a coaxial gaseous fuel jet in accordance with one or more embodiments of the present disclosure.
Figure 3B:
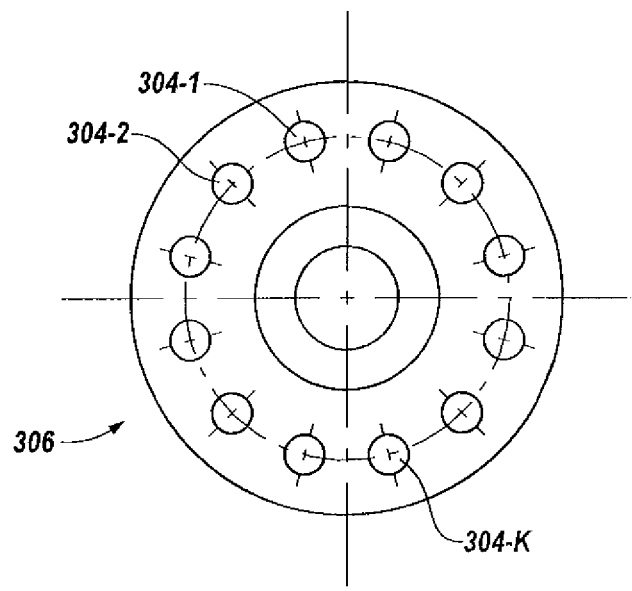

FIGS. 3A-3B illustrate various views of a portion of a coaxial gaseous fuel jet 314 in accordance with one or more embodiments of the present disclosure. For example, FIG. 3A illustrates a schematic cross-sectional view of fuel jet 314, and FIG. 3B illustrates a schematic front view of fuel jet 314. In the embodiment illustrated in FIGS. 3A and 3B, gaseous fuel from coaxial gaseous fuel jet 314 and oxygen from coaxial oxygen jets 304-1, 304-2, . . . , 304-K may not mix (e.g., may be kept completely separate) before entering a flame zone (e.g., flame zone 105 previously described in connection with FIGS. 1A-1D). The oxygen from the oxygen jets can enter the flame zone in a uniform annular distribution about opening 306 of fuel jet 314, which can cool fuel jet 314 and/or prevent a flame formed in the flame zone from attaching to fuel jet 314.

As shown in FIGS. 3A-3B, coaxial gaseous fuel jet 314 can include an opening (e.g., nozzle) 306. However, fuel jet 314 may not include any additional openings. For example, fuel jet 314 may not include any radial openings adjacent coaxial oxygen jets 304-1, 304-2, . . . , 304-K. Accordingly, fuel jet 314 may not receive any oxygen from the oxygen jets. For example, the gaseous fuel of fuel jet 314 may be carried through fuel jet 314 and enter the flame zone via opening 306, without mixing with any oxygen from the oxygen jets.

Further, coaxial gaseous fuel jet 314 may not include a counter bore port. For example, fuel jet 314 may not include a counter bore port that increases the diameter of fuel jet 314. Rather, the diameter of fuel jet 314 may remain constant until reaching opening 306, as illustrated in FIG. 3A.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A gaseous fuel-oxygen burner, comprising:
    a flame zone in which combustion of gaseous fuel and oxygen occurs to form a flame;
    at least three gaseous fuel openings positioned radially around a central axis of the burner;
    at least three oxygen jets positioned radially around and outside of each respective one of the at least three gaseous fuel openings and configured to provide the flame zone with oxygen, wherein a center of each respective one of the at least three gaseous fuel openings is a same distance from each of the at least three oxygen jets positioned radially around and outside of that respective gaseous fuel opening; and
    a plurality of circumferential openings positioned along a circumference of the burner around the at least three oxygen jets, wherein the plurality of openings are configured to provide the flame zone with oxygen;
    each of the at least three gaseous fuel openings comprising a gaseous fuel jet and a plurality of oxygen openings;
    wherein each respective one of the at least three gaseous fuel openings is separate from the at least three oxygen jets positioned radially around and outside of that respective gaseous fuel opening and are configured to:
        receive a portion of the oxygen from the at least three oxygen jets positioned radially around and outside of that respective gaseous fuel opening before the oxygen from the at least three oxygen jets enters the flame zone; and
        provide the flame zone with gaseous fuel mixed with the portion of the oxygen received from the at least three oxygen jets positioned radially around and outside of that respective gaseous fuel opening; and wherein each of the at least three gaseous fuel openings includes:
the plurality of oxygen openings configured to receive the portion of the oxygen from the at least three oxygen jets before the oxygen from the at least three oxygen jets enters the flame zone; and
each of the at least three gaseous fuel openings positioned adjacent the flame zone to provide the flame zone with the gaseous fuel mixed with the portion of the oxygen received from the at least three oxygen jets positioned radially around and outside of that respective gaseous fuel opening
wherein all openings and lets of the burner are only positioned radially around the central axis of the burner.

2. The gaseous fuel-oxygen burner of claim 1, wherein the opening of each of the at least three gaseous fuel jets is a circular opening.

3. The gaseous fuel-oxygen burner of claim 1, wherein each of the at least three oxygen jets includes an opening adjacent the flame zone to provide the flame zone with oxygen.

4. The gaseous fuel-oxygen burner of claim 3, wherein the opening of each of the at least three oxygen jets is a circular opening.

5. The gaseous fuel-oxygen burner of claim 1, wherein the gaseous fuel-oxygen burner includes a single fuel supply connection coupled to the at least three gaseous fuel jets to provide the gaseous fuel to the at least three gaseous fuel jets.

6. The gaseous fuel-oxygen burner of claim 1, wherein the gaseous fuel-oxygen burner includes a single oxygen supply connection coupled to the at least three oxygen jets to provide oxygen to the at least three oxygen jets.

7. A gaseous fuel-oxygen burner, comprising:
a flame zone in which combustion of gaseous fuel and oxygen occurs to form a flame;
at least three gaseous fuel openings positioned radially around a central axis of the burner; and
at least three parallel oxygen jets positioned radially around and outside of each respective one of the at least three gaseous fuel openings and configured to provide the flame zone with oxygen, wherein a center of each respective one of the at least three gaseous fuel openings is a same distance from each of the at least three oxygen jets positioned radially around and outside of that respective gaseous fuel opening; and
a plurality of circumferential openings positioned along a circumference of the burner around the at least three oxygen lets, wherein the plurality of openings are configured to provide the flame zone with oxygen;
each of the at least three gaseous fuel openings comprising a gaseous fuel jet and a plurality of oxygen openings; and
wherein each of the at least three gaseous fuel openings are separate from the at least three parallel oxygen jets positioned radially around and outside of that respective gaseous fuel opening and are configured to:
receive a portion of the oxygen from the at least three parallel oxygen jets positioned radially around and outside of that respective gaseous fuel opening before the oxygen from the at least three parallel oxygen jets enters the flame zone; and
provide the flame zone with gaseous fuel mixed with the portion of the oxygen received from the at least three parallel oxygen jets positioned radially around and outside of that respective gaseous fuel opening
and
wherein each of the at least three gaseous fuel openings includes:
the plurality of oxygen openings configured to receive the portion of the oxygen from the at least three parallel oxygen jets before the oxygen from the at least three parallel oxygen jets enters the flame zone; and
each of the at least three gaseous fuel openings positioned adjacent the flame zone to provide the flame zone with the gaseous fuel mixed with the portion of the oxygen received from the at least three parallel oxygen jets positioned radially around and outside of that respective gaseous fuel opening
wherein all openings and lets of the burner are only positioned radially around the central axis of the burner.

8. The gaseous fuel-oxygen oxygen burner of claim 7, wherein the portion of the oxygen received from the at least three parallel oxygen jets positioned radially around and outside of each respective gaseous fuel jet is less than an amount of oxygen needed to combust the gaseous fuel.

9. The gaseous fuel-oxygen burner of claim 7, wherein each of the at least three gaseous fuel jets includes:
a counter bore port to carry the gaseous fuel mixed with the portion of the oxygen received from the at least three parallel oxygen jets positioned radially around and outside of that respective gaseous fuel jet;
wherein the plurality of openings of each respective gaseous fuel jet are adjacent the counter bore port.

10. The gaseous fuel-oxygen burner of claim 9, wherein a diameter of each respective gaseous fuel jet increases at the counter bore port.

11. The gaseous fuel-oxygen burner of claim 9, wherein a diameter of each respective gaseous fuel jet and counter bore port are sized such that a velocity of the gaseous fuel carried through each respective gaseous fuel jet is equal to a velocity of the gaseous fuel mixed with the portion of the oxygen carried through the counter bore port.

12. The gaseous fuel-oxygen burner of claim 7, wherein the plurality of openings of each of the at least three the gaseous fuel jets are radial openings.

13. A method of operating a gaseous fuel-oxygen burner, comprising:
providing gaseous fuel into a flame zone from at least three gaseous fuel openings positioned radially around a central axis of the burner;
providing oxygen into the flame zone from at least three oxygen jets positioned radially around and outside of each respective one of the at least three gaseous fuel openings, wherein a center of each respective one of the at least three gaseous fuel openings is a same distance from each of the at least three oxygen jets positioned radially around and outside of that respective gaseous fuel opening; and
providing oxygen into the flame zone from a plurality of circumferential openings positioned along a circumference of the burner around the at least three oxygen jets;
wherein each of the at least three gaseous fuel openings comprises a gaseous fuel jet and a plurality of oxygen openings;
wherein providing the gaseous fuel into the flame zone from the at least three gaseous fuel openings includes:
receiving, by each of the at least three gaseous fuel openings a portion of the oxygen from the at least three oxygen jets positioned radially around and outside of that respective gaseous fuel opening before the oxygen from the at least three oxygen jets enters the flame zone; and providing, by each of the at least three gaseous fuel openings, the flame zone with gaseous fuel mixed with the portion of the oxygen received from the at least three oxygen jets positioned radially around and outside of that respective gaseous fuel opening; and wherein each of the at least three gaseous fuel openings includes:

the plurality of oxygen openings configured to receive the portion of the oxygen from the at least three oxygen jets before the oxygen from the at least three oxygen jets enters the flame zone; and each of the at least three gaseous fuel openings positioned adjacent the flame zone to provide the flame zone with the gaseous fuel mixed with the portion of the oxygen received from the at least three oxygen jets positioned radially around and outside of that respective gaseous fuel opening;

wherein all openings and lets of the burner are only positioned radially around the central axis of the burner.

14. The method of claim 13, wherein the method includes combusting the gaseous fuel from the at least three gaseous fuel jets and the oxygen from the at least three oxygen jets in the flame zone to form a flame.

15. The method of claim 13, wherein the method includes providing the oxygen from the at least three oxygen jets positioned radially around and outside of each respective gaseous fuel jets into the flame zone in a uniform annular distribution about that respective gaseous fuel jet.

16. The method of claim 13, wherein the method includes cooling an opening of each respective one of the at least three gaseous fuel jets by providing the oxygen from the at least three oxygen jets positioned radially around and outside of that respective gaseous fuel jet into the flame zone.

17. The method of claim 13, wherein the method includes preventing a flame from attaching to each respective one of the at least three gaseous fuel jets by providing the oxygen from the at least three oxygen jets positioned radially around and outside of that respective gaseous fuel jet into the flame zone.

* * * * *